United States Patent
Lacroix

Patent Number: 6,090,165
Date of Patent: Jul. 18, 2000

[54] DYE MIXTURES AND THEIR USE

[75] Inventor: Roger Lacroix, Village-Neuf, France

[73] Assignee: Ciba Specialty Chemicals Corporation, Tarrytown, N.Y.

[21] Appl. No.: 09/021,326

[22] Filed: Feb. 10, 1998

[30] Foreign Application Priority Data

Feb. 10, 1997 [CH] Switzerland ................ 285/97

[51] Int. Cl.⁷ .................................................. C09B 49/00
[52] U.S. Cl. ........................ 8/643; 8/679; 8/917; 8/924; 552/221; 552/225; 552/228; 552/229; 552/230; 552/232; 552/238
[58] Field of Search ................ 8/917, 924, 643, 8/679; 552/230, 221, 225, 228, 229, 232, 238

[56] References Cited

U.S. PATENT DOCUMENTS

| | | | |
|---|---|---|---|
| 2,314,356 | 3/1943 | Lee et al. | 260/371 |
| 3,995,997 | 12/1976 | Boehmke et al. | 8/84 |
| 4,014,646 | 3/1977 | Tullio | 8/39 |
| 4,396,393 | 8/1983 | Schaetzer et al. | . |
| 4,402,704 | 9/1983 | Raisin et al. | 8/641 |
| 4,445,905 | 5/1984 | Schaetzer et al. | . |
| 4,537,598 | 8/1985 | Schaetzer et al. | . |
| 4,582,897 | 4/1986 | Mäusezahl et al. | 534/783 |
| 5,416,227 | 5/1995 | Tanner et al. | 552/232 |

FOREIGN PATENT DOCUMENTS

| | | |
|---|---|---|
| 0042357 | 12/1981 | European Pat. Off. . |
| 0083299 | 7/1983 | European Pat. Off. . |
| 0445075 | 9/1991 | European Pat. Off. . |
| 2341293 | 3/1975 | Germany . |

*Primary Examiner*—Margaret Einsmann
*Attorney, Agent, or Firm*—Kevin T. Mansfield

[57] ABSTRACT

Dye mixtures which contain a dye of the formula

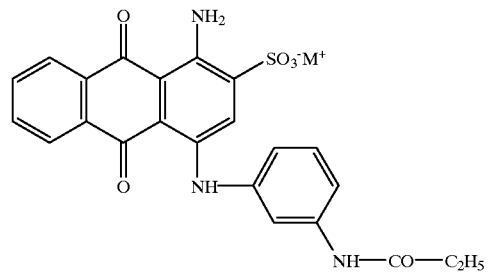

together with a dye of the formula

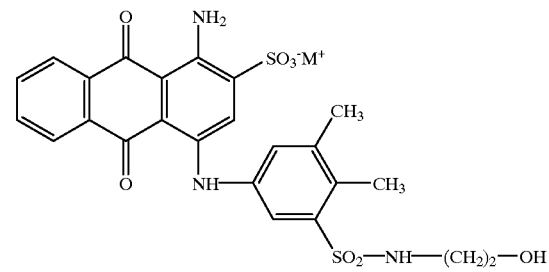

in which $M^+$ in the dyes of the formulae (1) and (2) are ammonium cations

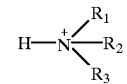

which are identical to or different from one another, of an amine of the formula

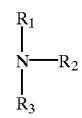

where $R_1$ and $R_2$ independently of one another are hydrogen, $C_1$—$C_6$alkyl or $C_2$—$C_6$alkyl substituted by hydroxyl or amino and, if appropriate, interrupted by an oxygen atom, and $R_3$ is $C_2$—$C_6$alkyl substituted by hydroxyl or amino and, if appropriate, interrupted by an oxygen atom, afford dyeings having good fastnesses on nitrogen-containing or hydroxyl group-containing fibre materials.

8 Claims, No Drawings

DYE MIXTURES AND THEIR USE

The present invention relates to mixtures of dyes, and their use for the dyeing or printing of nitrogen-containing or hydroxyl group-containing fibre materials.

The object on which the present invention was based was to find dye mixtures which are suitable for dyeing or printing nitrogen-containing or hydroxyl group-containing fibre materials, in particular natural or synthetic polyamide fibre materials, have good fastness properties and, in particular, a good solubility and good printing paste stability.

It has now been found that the dye mixtures below largely satisfy these requirements.

The present invention relates to dye mixtures which contain a dye of the formula

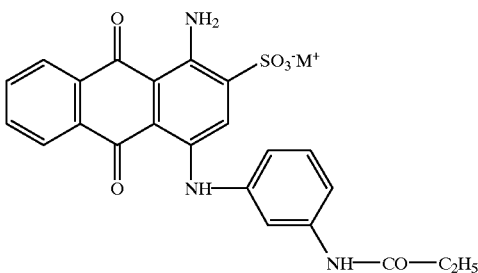

(1)

together with a dye of the formula

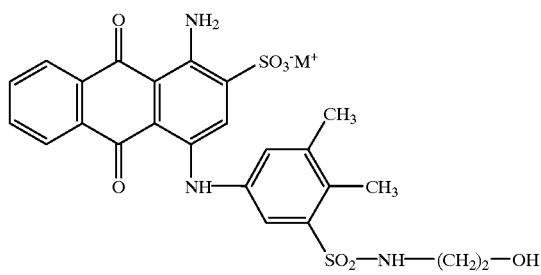

(2)

in which $M^+$ in the dyes of the formulae (1) and (2) are ammonium cations

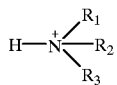

which are identical to or different from one another, of an amine of the formula

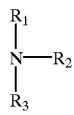

(3)

where
$R_1$ and $R_2$ independently of one another are hydrogen, $C_1$—$C_6$alkyl or $C_2$—$C_6$alkyl substituted by hydroxyl or amino and, if appropriate, interrupted by an oxygen atom and $R_3$ is $C_2$—$C_6$alkyl substituted by hydroxyl or amino and, if appropriate, interrupted by an oxygen atom.

A suitable $C_1$—$C_6$alkyl for $R_1$ and $R_2$ is in particular $C_1$—$C_4$alkyl, for example methyl or ethyl.

A suitable $C_2$—$C_6$alkyl for $R_1$, $R_2$ and $R_3$, which is substituted by hydroxyl or amino and, if appropriate, interrupted by an oxygen atom, is in particular corresponding $C_2$—$C_4$alkyl radicals, for example —$CH_2CH_2OH$, —$CH_2$—$CH(OH)$—$CH_3$, —$CH_2CH_2NH_2$ or —$(CH_2)_2$—O—$(CH_2)_2$—OH.

$R_1$ is preferably hydrogen, methyl, ethyl, $C_2$—$C_3$alkyl substituted by hydroxyl or a radical of the formula —$(CH_2)_2$—O—$(CH_2)_2$—OH.

$R_1$ is particularly preferably $C_2$—$C_3$alkyl substituted by hydroxyl or a radical of the formula —$(CH_2)_2$—O—$(CH_2)_2$—OH.

$R_1$ is very particularly preferably propyl substituted by hydroxyl, in particular a radical of the formula —$CH_2$—$CH(OH)$—$CH_3$.

$R_2$ is preferably hydrogen, methyl, ethyl, $C_2$—$C_3$alkyl substituted by hydroxyl or a radical of the formula —$(CH_2)_2$—O—$(CH_2)_2$—OH.

$R_2$ is particularly preferably $C_2$—$C_3$alkyl substituted by hydroxyl or a radical of the formula —$(CH_2)_2$—O—$(CH_2)_2$—OH.

$R_2$ is very particularly preferably propyl substituted by hydroxyl, in particular a radical of the formula —$CH_2$—$CH(OH)$—$CH_3$.

$R_3$ is preferably $C_2$—$C_3$alkyl substituted by hydroxyl or a radical of the formula —$(CH_2)_2$—O—$(CH_2)_2$—OH.

$R_3$ is particularly preferably propyl substituted by hydroxyl, in particular a radical of the formula —$CH_2$—$CH(OH)$—$CH_3$.

$R_2$ and $R_3$ independently of one another are preferably $C_2$—$C_3$alkyl substituted by hydroxyl or a radical of the formula —$(CH_2)_2$—O—$(CH_2)_2$—OH, in particular propyl substituted by hydroxyl and preferably radicals of the formula —$CH_2$—$CH(OH)$—$CH_3$.

$R_1$, $R_2$ and $R_3$ independently of one another are particularly preferably $C_2$—$C_3$alkyl substituted by hydroxyl or a radical of the formula —$(CH_2)_2$—O—$(CH_2)_2$—OH, in particular propyl substituted by hydroxyl and preferably radicals of the formula —$CH_2$—$CH(OH)$—$CH_3$.

Of particular interest are dye mixtures which, based on the total amount of the dyes of the formulae (1) and (2), contain at least 5 per cent by weight, preferably at least 10 per cent by weight and in particular at least 15 per cent by weight, of a dye of the formula (2).

The present invention furthermore relates to dyes of the formula (1) and dyes of the formula (2), the meanings and preferences indicated above applying for $R_1$, $R_2$ and $R_3$.

Dyes of the formulae (1) and (2) can be obtained, for example, by reacting 1-amino4-bromo-anthraquinone-2-sulfonic acid with 3-propionamidoaniline or 5-amino-1,2-xylene-3-sulfo-2'-hydroxyethylamide, and then reacting with an amine of the formula (3). The first reaction is preferably carried out in aqueous solution at a temperature of, for example, 50 to 100° C., in particular 65 to 85° C., in the presence of a base, for example, sodium hydrogencarbonate and a catalyst, for example, a mixture of copper and copper chloride. The reaction with an amine of the formula (3) is carried out, for example, by neutralization of an aqueous dye solution with the corresponding amine.

Mixtures of the dyes of the formulae (1) and (2) can be obtained, for example, by mixed synthesis, 1-amino-4-bromoanthraquinone-2-sulfonic acid being reacted with an appropriate mixture of 3-propionamidoaniline and 5-amino-1,2-xylene-3-sulfo-2'-hydroxyethylamide. The reaction with an amine of the formula (3) can be carried out as indicated above.

The dye mixtures according to the invention can furthermore also be prepared by mixing of the individual dyes. This mixing process is carried out, for example, in suitable mills, e.g. ball and pinned-disc mills, and also in kneaders or mixers. The dye mixtures can furthermore be prepared, for example, by spray drying of the aqueous dye mixtures.

The present invention furthermore relates to concentrated aqueous solutions of dyes, which contain 5 to 50% by weight, in particular 10 to 50% by weight and preferably 20 to 50% by weight, based on the total weight of the solution, of a dye of the formula (1) or (2) or in particular of a dye mixture of the dyes of the formulae (1) and (2).

The concentrated aqueous solutions according to the invention can contain further additives, for example urea, caprolactam or polyethylene glycol. The concentrated aqueous solutions according to the invention can furthermore also contain substances inhibiting fungal and/or bacterial growth.

The dye solutions according to the invention furthermore have a good hard water resistance and they can be diluted with water in any desired ratio, for example in the preparation of the dye liquor, without the dissolved dyes precipitating.

The dye mixtures and dyes according to the invention can be used in the customary dyeing or printing processes. Apart from water and the dyes, the dye liquors or printing pastes can contain further additives, for example wetting agents, antifoam agents, levelling agents or agents affecting the properties of the textile material, for example softening agents, additives for flameproof finishing or dirt-, water- and oil-repelling agents and water-softening agents and natural or synthetic thickeners, for example alginates and cellulose ethers.

The dye mixtures and dyes according to the invention are also suitable for dyeing short liquors, for example in continuous dyeing processes or batchwise and continuous foam-dyeing processes.

The dye mixtures and dyes according to the invention are distinguished in particular by good exhaust properties, good solubility and printing paste stability and also by good combining ability. Furthermore, the dye mixtures and dyes according to the invention have a good storage stability, their concentrated solutions, for example, being stable on storage for several months at a temperature from −5 to +40° C.

Level dyeings with good general fastnesses, in particular good rubbing fastness, wet fastness, wet rubbing fastness and light fastness, are obtained.

The dye mixtures and dyes according to the invention are suitable for dyeing or printing hydroxyl group-containing or nitrogen-containing fibre material. They are particularly suitable for dyeing or printing natural polyamide materials, for example wool, or in particular synthetic polyamide materials, for example polyamide 6 or polyamide 6.6, or silk, and are also suitable for dyeing or printing mixed fabrics or yarns made of wool and synthetic polyamide.

The material mentioned, in particular textile material, can in this case be present in very different processing forms, for example as a fibre, yarn, knitted fabric or woven fabric and in particular in the form of carpets.

In the following examples, parts are parts by weight. The temperatures are degrees Celsius. The relationship between parts by weight and parts by volume is the same as that between the gram and cubic centimeter.

EXAMPLE 1

880 parts of water are introduced into a sulfonating flask and 382 parts of 1-amino-4-bromoanthraquinone-2-sulfonic acid, 138 parts of 3-propionamidoaniline and 51.2 parts of 5-amino-1,2-xylene-3-sulfo-2'-hydroxyethylamide are introduced. After addition of 201 parts of sodium hydrogencarbonate, the mixture is warmed to a temperature of 75° C. 1 part of copper and 1 part of copper chloride are then added with continuous stirring. After about 6 hours, the reaction is complete. 2180 parts of water and 125 parts of sodium sulfate are added, the temperature falling to 50° C. The pH is adjusted to a value of 5 to 6 using 75 parts of sulfuric acid (60%) and 188 parts of sodium sulfate are added. The product obtained is filtered off with suction through a suction filter and washed with a warm solution of 245 parts of sodium chloride in 4780 parts of water. 860 parts of a still moist product are obtained, which contains the dyes of the formulae

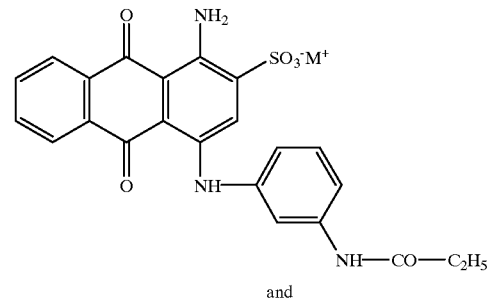

(101)

and

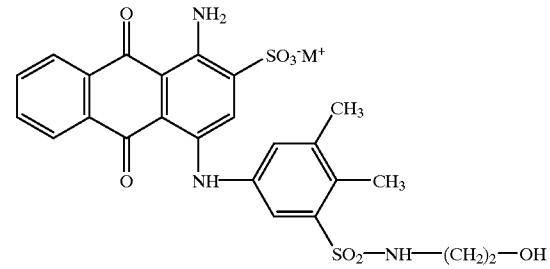

(102)

as sodium salts in a weight ratio of 80:20.

100 parts of the product thus obtained, which contains 64% by weight of dye and 36% by weight of water, are suspended in 600 parts of water and warmed to a temperature of 80 to 90° C. with vigorous stirring. 35 parts of hydrochloric acid (32%) are then added dropwise and the mixture is stirred at a temperature of 85° C. for 30 minutes. The suspension is then filtered off with suction while still hot, washed with 100 parts of hydrochloric acid (4%) and well pressed off. About 115 parts of a moist product which are suspended in 70 parts of demineralized water are obtained. This paste is then neutralized with 40 parts of aqueous triisopropanolamine (66%) at a pH of 7 to 7.2. 0.7 part of a commercially available bactericide is then added and the dye solution is subjected to clarifying filtration. The composition of this liquid formulation is as follows: 37.7% by weight of a mixture of the dyes of the formulae (1) and (2) as salts of triisopropanolamine, the weight ratio of the dyes being as indicated above, 0.3 part of a commercially available bactericide and 62% by weight of water.

The formulation obtained is stable on storage at a temperature of −5 to +40° C. and dyes polyamide fabric in blue colour shades.

EXAMPLE 2

880 parts of water are initially introduced into a sulfonating flask and 382 parts of 1-amino-4-bromoanthraquinone-2-sulfonic acid, 138 parts of 3-propionamidoaniline and 51.2 parts of 5-amino-1,2-xylene-3-sulfo-2'-hydroxyethylamide are introduced. After addition of 201 parts of sodium hydrogencarbonate, the mixture is warmed to a temperature of 75° C. 1 part of copper and 1 part of copper chloride are then added with continuous stirring. After about 6 hours the reaction is complete. 2180 parts of water and 345 parts of 32% HCl are added. The mixture is stirred at 80° C. for a further 30 minutes and the product obtained is filtered off with suction through a suction filter and washed with a warm solution of 25 parts of HCl in 800 parts of water. 840 parts of a still moist product which contains the dyes of the formulae (101) and (102) as free acids (M=H) in a weight ratio of 80:20 are obtained. 100 parts of the moist product are suspended in 70 parts of demineralized water. This paste is then neutralized at a pH of 7 to 7.2 with 40 parts of aqueous triisopropanolamine (66%). 0.7 part of a commercially available bactericide is then added and the dye solution is subjected to clarifying filtration. The composition of this liquid formulation is as follows:

37.7% by weight of a mixture of the dyes of the formulae (1) and (2) as salts of triisopropanolamine, the weight ratio of the dyes being as indicated above, 0.3 part of a commercially available bactericide and 62% by weight of water.

The formulation obtained is stable on storage at a temperature of −5 to +40° C. and dyes polyamide fabric in blue colour shades.

Dyeing procedure I 10 parts of polyamide-6,6 fabric are dyed in 500 parts of an aqueous liquor which contains 2 g/l of ammonium acetate and is adjusted to pH 5 using acetic acid. The content of the liquid formulation according to Example 1 is 2%, based on the fibre weight. The dyeing time at a temperature of 98° C. is 30 to 90 minutes. The dyed polyamide-6,6 fabric is then taken out and washed and dried in the customary manner.

Dyeing procedure II 10 parts of polyamide-6,6 fabric are dyed in 500 parts of an aqueous liquor which contains 1 g/l of monosodium phosphate and is adjusted to pH 6 using disodium phosphate. The content of the liquid formulation according to Example 1 is 2%, based on the fibre weight. The dyeing time at a temperature of 98° C. is 30 to 90 minutes. The dyed polyamide-6,6 fabric is then taken out and washed and dried in the customary manner.

Dyeing procedure III 10 parts of wool pieces are dyed in 500 parts of an aqueous liquor. Based on the fibre weight, the liquor contains 2% of the liquid formulation according to Example 1, 5% of Glauber's salt calc. and 2% of 80% acetic acid. The dyeing time at a temperature of 98° C. is 30–60 minutes.

What is claimed is:

1. A dye of the formula (2)

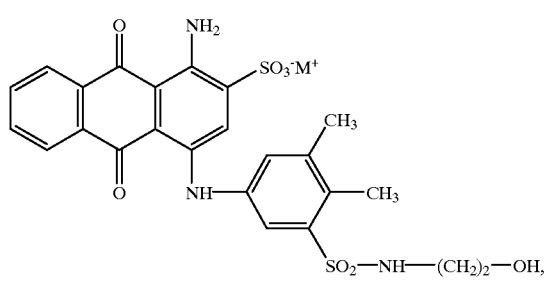

in which M$^+$ is an ammonium cation

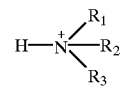

of an amine of the formula (3)

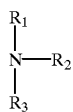

where $R_1$, $R_2$ and $R_3$ are propyl substituted by hydroxyl.

2. A dye of the formula (1)

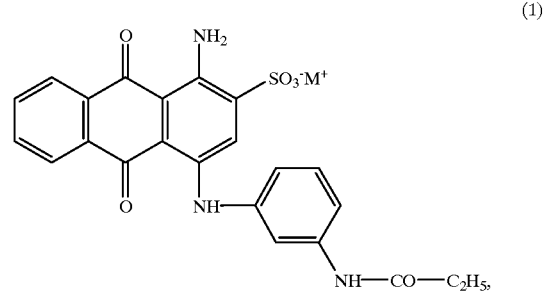

in which M$^+$ is an ammonium cation

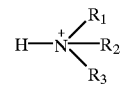

of an amine of the formula (3)

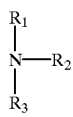

where $R_1$, $R_2$ and $R_3$ are propyl substituted by hydroxyl.

3. A dye mixture which contains a dye of the formula (1)

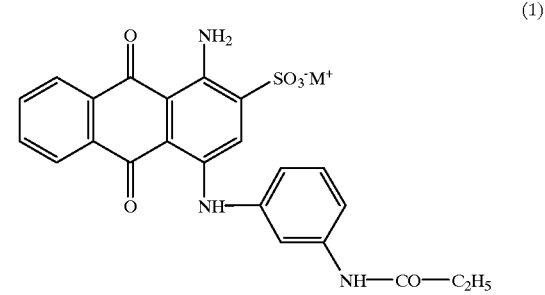

together with a dye of the formula (2)

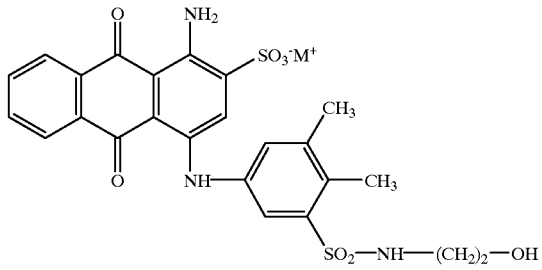

in which M⁺ in the dyes of the formulae (1) and (2) are ammonium cations

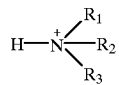

of an amine of the formula (3)

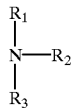

where $R_1$, $R_2$ and $R_3$ are propyl substituted by hydroxyl.

4. A concentrated aqueous solution of dyes, which contains 5 to 50% by weight, based on the total weight of the solution, of a dye mixture according to claim 3.

5. A process for dyeing or printing hydroxyl group-containing or nitrogen group-containing fibre material, which process comprises applying to said fibre material a tinctorial amount of the dye mixture according to claim 3.

6. A process according to claim 5, wherein said fibre material is natural or synthetic polyamide fibre material.

7. A process according to claim 5, wherein said fibre material is synthetic polyamide fibre material.

8. A dye mixture according to claim 3 wherein $R_1$, $R_2$ and $R_3$ are radicals of the formula —$CH_2$—$CH(OH)$—$CH_3$.

* * * * *